(12) United States Patent
Crownover

(10) Patent No.: US 7,269,324 B2
(45) Date of Patent: Sep. 11, 2007

(54) HELICAL FIBER OPTIC MODE SCRAMBLER

(76) Inventor: John D. Crownover, 1100 Brushy Bend, Round Rock, TX (US) 78681

( * ) Notice: Subject to any disclaimer, the term of this patent is extended or adjusted under 35 U.S.C. 154(b) by 0 days.

(21) Appl. No.: 11/095,718

(22) Filed: Mar. 31, 2005

(65) Prior Publication Data

US 2006/0222305 A1 Oct. 5, 2006

(51) Int. Cl.
G02B 6/00 (2006.01)

(52) U.S. Cl. .................. 385/137; 385/28; 385/123

(58) Field of Classification Search ............. 385/137, 385/104, 28, 123
See application file for complete search history.

(56) References Cited

U.S. PATENT DOCUMENTS

| | | | | |
|---|---|---|---|---|
| 3,660,590 A | * | 5/1972 | Conant | 174/47 |
| 4,146,302 A | * | 3/1979 | Jachimowicz | 385/111 |
| 4,414,697 A | * | 11/1983 | Hartley | 7/107 |
| 4,690,498 A | * | 9/1987 | Priaroggia | 385/113 |
| 4,907,854 A | * | 3/1990 | Nakasone et al. | 385/137 |
| 4,998,792 A | | 3/1991 | Boersler | |
| 5,138,675 A | | 8/1992 | Schofeild | |
| 5,193,134 A | * | 3/1993 | Pizzorno et al. | 385/105 |
| 5,222,178 A | * | 6/1993 | Betker et al. | 385/110 |
| 5,408,545 A | * | 4/1995 | Lee et al. | 385/11 |
| 5,892,615 A | | 4/1999 | Grubb et al. | |
| 5,892,866 A | | 4/1999 | Bristow et al. | |
| 6,043,895 A | * | 3/2000 | Masterson et al. | 356/436 |
| 6,192,179 B1 | | 2/2001 | Berkey et al. | |
| 6,295,161 B1 | * | 9/2001 | Bazzocchi | 359/341.33 |
| 6,626,917 B1 | * | 9/2003 | Craig | 606/144 |
| 6,813,424 B1 | * | 11/2004 | Dultz et al. | 385/123 |

* cited by examiner

Primary Examiner—Ellen E. Kim

(57) ABSTRACT

The methods and apparatus of the present invention provide advantages for remote laser delivery systems that conduct high levels of light energy through a fiber optic cable to a selectable target surface. Helical fiber optic mode scramblers in accordance with the present invention are an integral portion of a fiber optic cable having a rigid curvature predetermined to advantageously influence the intermodal dispersion characteristics of the fiber optic cable. The various aspects of the present inventions may be employed to increase the useful life of a fiber optic cable, increase the energy throughput of a fiber optics cable, implement smaller sized scramblers, implement more efficient scramblers or to provide for robust implementations that are also easy to assemble. Scrambler assemblies in accordance with the present invention include a support structure and a cylindrical sleeve that work in tandem to maintain to the predetermined spiral curvature of the helical mode scrambler.

19 Claims, 4 Drawing Sheets

SECTION A-A

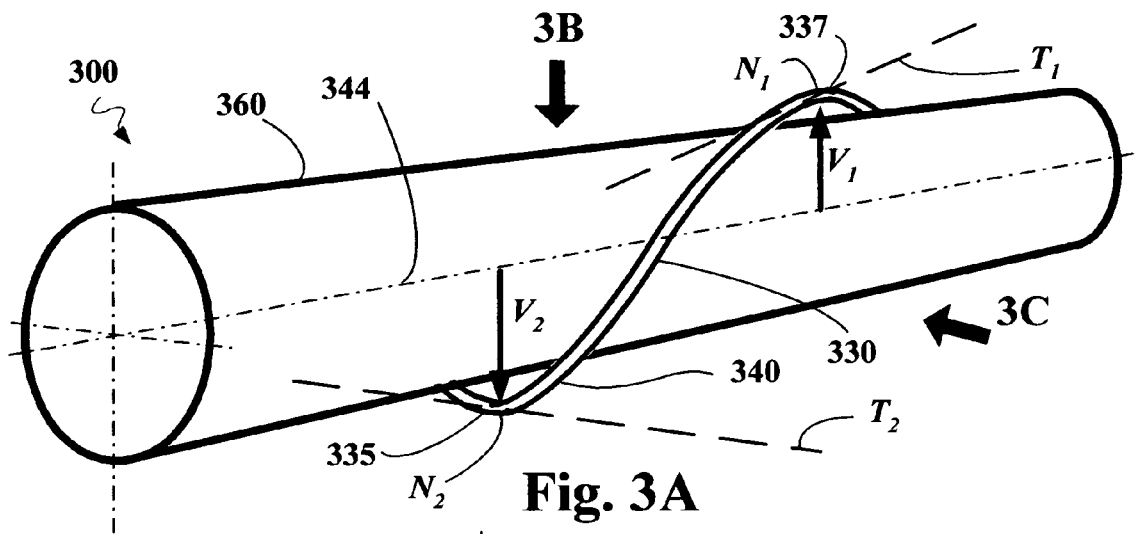
Fig. 3A
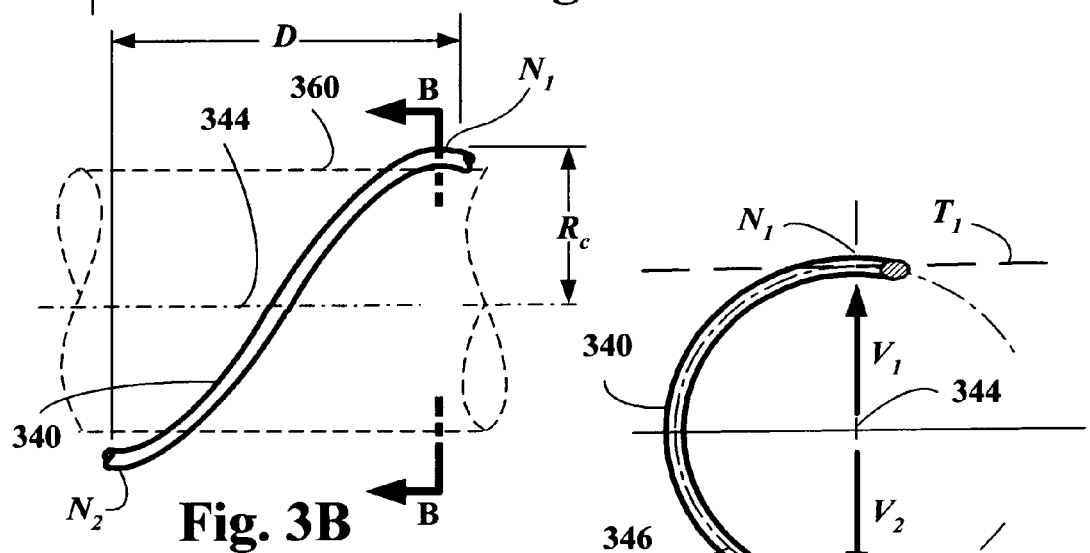
Fig. 3B
Section B-B
Fig. 3D
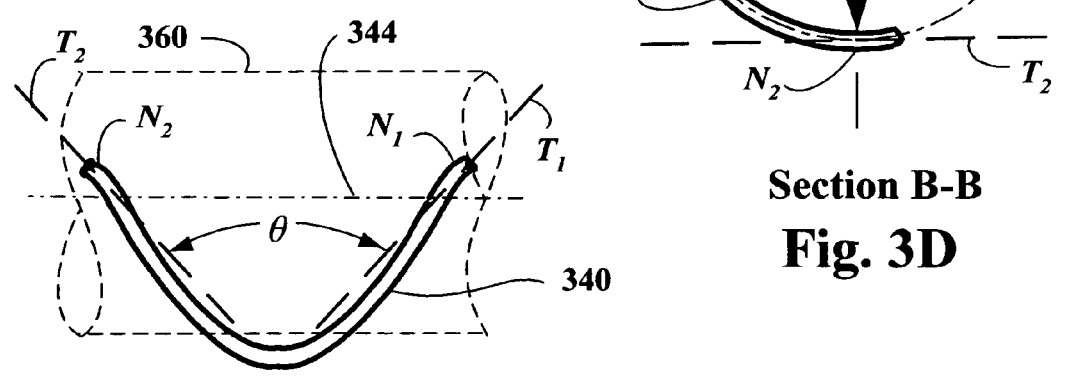
Fig. 3C

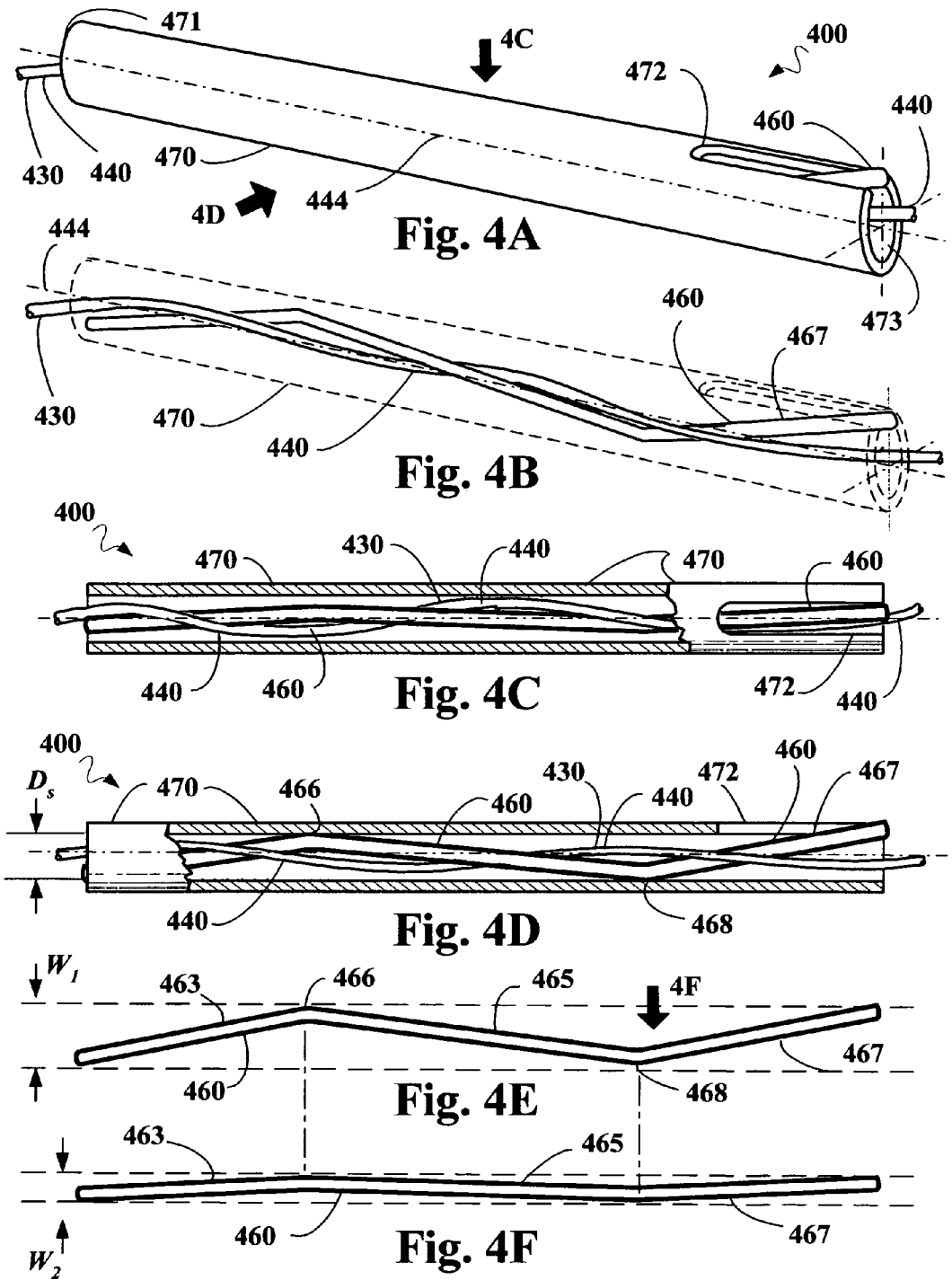

HELICAL FIBER OPTIC MODE SCRAMBLER

FIELD OF THE INVENTION

The present invention relates to optical transmission systems; more particularity, the invention relates to an enhanced fiber optic mode scrambler, suitable for remote laser delivery systems.

BACKGROUND OF THE INVENTION

Remote laser delivery systems involve the delivery of light energy through a fiber optic cable and directing the light energy to a target surface to produce visual effects, heating or prolonged light exposure. UV photolithography, welding, engraving, sensors and analytical instruments are among the uses for remote laser delivery systems. In addition, the medical sciences have been advanced through the use of remote laser delivery systems to perform precise cutting and ablation of tissue in surgery, as well as, photodynamic non-ablative therapy such as hair removal, topical laser peel.

Maximizing the energy transmission capacity and maximizing the service life of a fiber optic cable are important concerns in designing remote laser delivery systems. Maximizing the number of distinct physical paths in which light energy travels in a conduit provides for maximized energy delivery capacity of the conduit. Accordingly, the energy transmission capacity of a fiber optic cable is increased by filling all available modes through which light energy (photons) propagate. The useful life of a fiber optic cable tends to be decreased when the light energy is concentrated in a relatively few modes due to localized heating of the fiber optic cable. It is common for the photons launched into a fiber optic cable to initially fill relatively few modes resulting in irregular photon density in the planes traverse to the direction the photons travel. Redistribution of the light energy to fill additional available modes results in a more uniform energy distribution and maximizes the service life of the fiber optic cable.

In addition to maximally filling the available fiber modes, reducing or eliminating cladding modes is important to preventing premature failure of a fiber optic cable. The fiber cladding is not intended as an energy conduit and removal of photon energy trapped within the cladding of the fiber can extend the service life of a fiber optic cable.

One method of redistributing light energy in a fiber optic cable is with a mode scrambler that introduces physical bends in the fiber optic cable. The trajectories (paths) of photons are altered by the physical bends to cause more modes to be filled. Prior art methods of introducing physical bends are problematic for fiber optic cables rated for high energy delivery due to the typically large cable diameter and corresponding increased resistant to mechanical bending. Also, the core of a fiber optic cable rated for high energy delivery are often composed of a silica glass, rather than plastic, which is comparatively stiff, having high tensile strength and high modulus of elasticity.

Many early advances in mode scrambler technology were driven by communication applications. However, design considerations involved in designing remote laser delivery systems differ substantially from fiber optic communication systems. In communication systems, light signal modulation and detection rather than energy delivery is the primary concern. Fiber optic cables utilized for communication commonly have a bend radius measured in inches. Whereas, fiber optic cables used for high-energy deliver may have a minimum bend radius that is measured in feet. Likewise, optimal mode filling is generally less important in communication systems than in high-energy delivery systems. New methods are needed to provide more effective fiber optic mode scramblers suitable for remote laser delivery systems, which maximize the energy capacity and life of a fiber optic cable and conserve physical space.

BRIEF DESCRIPTION OF THE DRAWINGS

The invention may best be understood by referring to the following description and accompanying drawings that are used to illustrate embodiments of the invention. In the drawings:

FIGS. 3A, 3B, 3C and 3D show an embodiment of a helical fiber optic mode scrambler of the present invention; and FIGS. 4A, 4C, 4D, 4E and 4F depict an embodiment of a helical fiber optic mode scrambler assembly of the present invention.

DETAILED DESCRIPTION OF THE INVENTION

The present invention may be employed to obtain one or more advantages such as increase the useful life of a fiber optic cable, increase the energy throughput of a fiber optic cable, implement smaller sized fiber optic scramblers, implement more efficient fiber optic scramblers and provide for robust implementations that are also easy to assemble.

In the following description, numerous specific details are set forth to provide a thorough understanding of the invention. However, it is understood that the invention may be practiced without these specific details. In other instances, structures and techniques have not been shown in detail in order not to obscure the invention.

Figure 1:
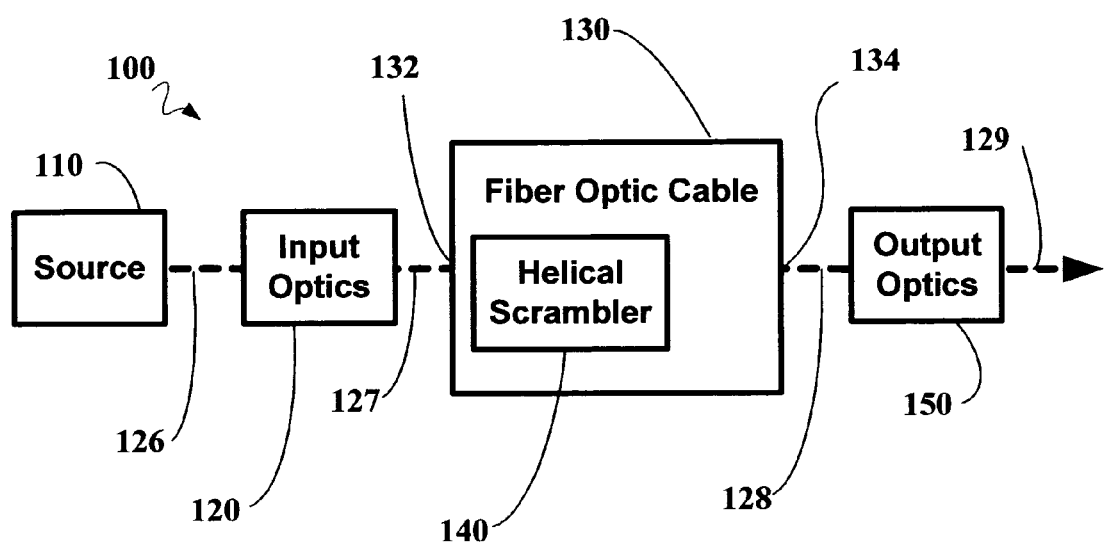
FIG. 1 is a block diagram of an embodiment of a remote laser delivery system employing a helical fiber optic mode scrambler of the present invention.

FIG. 1 is a block diagram of an exemplary remote laser delivery system 100 in accordance with the present invention. Remote laser delivery system 100 is suitable for a wide range of applications in which light energy is transmitted through a fiber optic cable 130 and directed to a target to provide, for example, visual effects, heating or prolonged light exposure. Remote laser delivery system 100 is comprised of a light source 110, input coupling optic 120, a fiber optic cable 130 and output coupling optic 150. Light source 110 provides selectively generated light energy. Light source 110 in the exemplary embodiment is an optically pumped alexandrite laser. Optionally, the light source 110 may generate pulse modulated laser energy. The frequency of the photon energy generated by suitable alterative light sources 110 may be in the visible spectrum or the invisible such as, for example, ultra-violet, or infrared radiation.

Fiber optic cable 130 is essentially a waveguide adapted to conduct light energy. Suitable fiber optic cables 130 are comprised of solid or hollow elongated cores composed of light-transmissive material such as glass or plastic that is surrounded by a cladding of light-transmissive material having an index of refraction that is lower than the index of refraction of the inner core. The length of the exemplary fiber optic cable 130 is about two meters long and has two opposing ends, a proximal end 132 and a distal end 134.

During operation, the fiber optic cable 130 receives light energy 127 launched into the proximal end 132 and emanates light energy 128 from the distal end 134.

In the various disclosed exemplary embodiments, the fiber optic cable 130, 230, 330 and 430 have a pure silica core. The core is surrounded by a hard polymer cladding, which in turn is surrounded by a Tefzel™ jacket. The diameter of the core is 1500 μm. The minimum bend radius $r_b$ is specified to be 300 times the core diameter for long term use and one-hundred times the core diameter for short term use. (See FIG. 2C for an illustration of an example bend radius $r_b$.)

The exemplary embodiment shown in FIG. 1 includes input coupling optics 120 coupled to the light source 110 and to the proximal end 132 of the fiber optic cable 130. During operation, the input coupling optics 120 accepts light energy 126 generated by light source 110 and launches light energy 127 into the proximal end 132 of the fiber optic cable 110. Suitable input coupling optics 120 may include one or more lenses to direct the photons 127 launched into the fiber optic cable 130.

Remote laser delivery system 100 is further comprised of a helical fiber optic mode scrambler 140, which is an integral portion of the fiber optic cable 130. Preferably the helical fiber optic mode scrambler 140 is located a relatively short distance from the proximal end 132 of the fiber optic cable 130, such as, for example, spaced less than one inch from the proximal end 132 of the exemplary two meter long fiber optic cable 130. Depending on the launch angle into the fiber optic cable 130, there can be hundreds, even thousands, of different ray paths or modes by which light energy propagates down the core. Helical fiber optic mode scrambler 140 is formed with a predetermined, rigid, spiral curvature that, during operation, determines the angles of reflection between propagating photons and the core/cladding interface in a manner to influence the intermodal dispersion characteristics of the fiber optic cable.

Still referring to FIG. 1. Output coupling optics 150 couple to the distal end 134 of fiber optic cable 130. During operation, the output coupling optics 150 receives light energy 128 emanating from the distal end 134 of the fiber optic cable 130 and directs light energy 129 to a selected target surface (not shown). Optionally, the output coupling optics 150 may include one or more lens (not shown) to collimate and/or focus the received light energy 128. In the exemplary embodiment of FIG. 1, the position and orientation of the distal end 134 and output coupling optics 150 may be maneuvered by a user to dynamically select the direction, within a predetermined limited range of directions, of the photon energy 129 emanating from the laser delivery system 100.

Figure 2A:
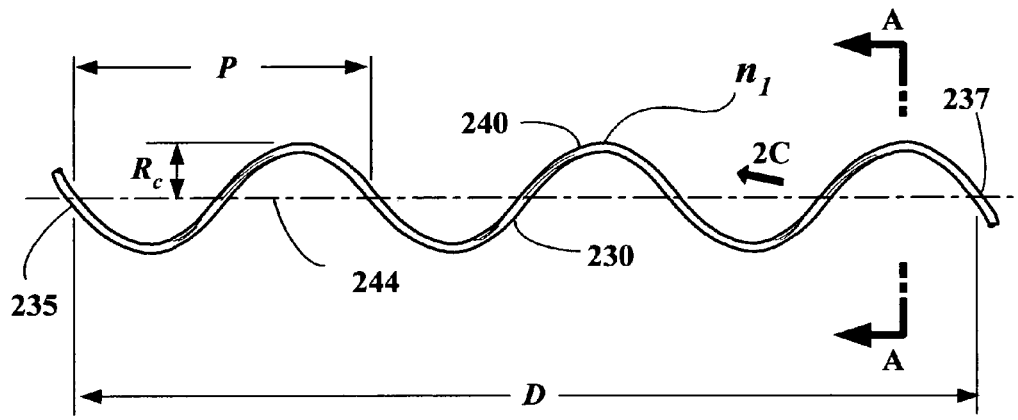
FIGS. 2A, 2B and 2C depict an embodiment of a helical fiber optic mode scrambler of the present invention.
Figure 2B:
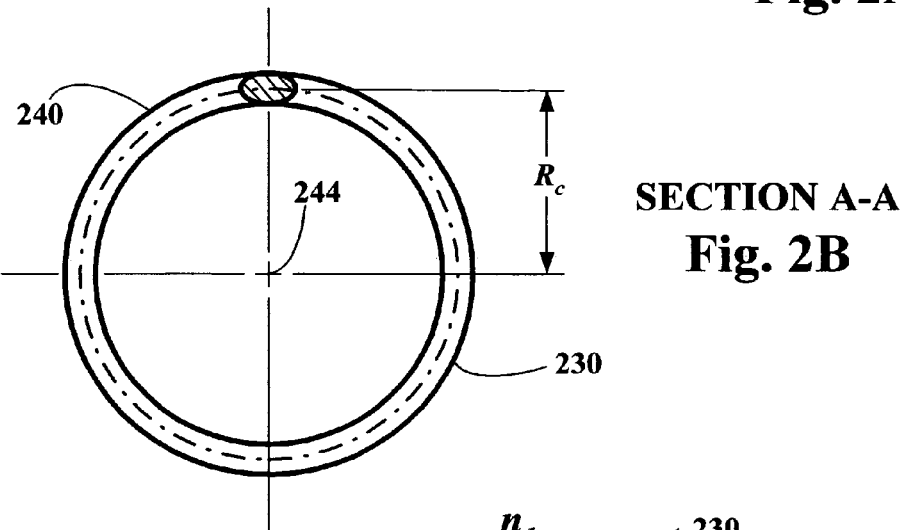
Figure 2C:
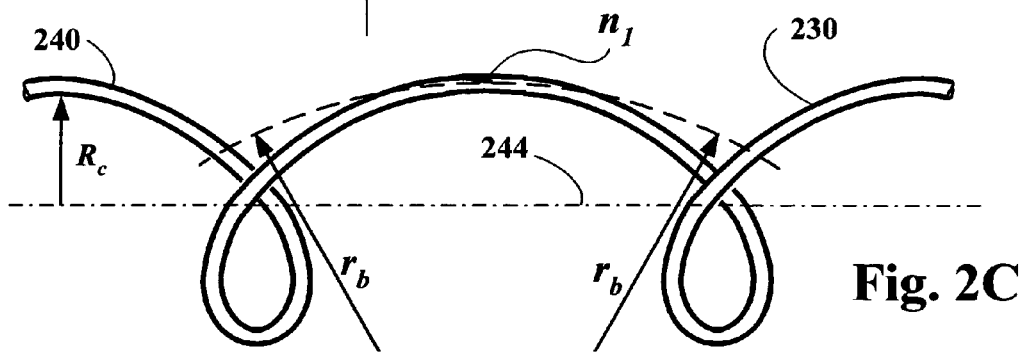

FIGS. 2A, 2B and 2C depict an embodiment of a helical fiber optic mode scrambler 240 that is in accordance with the present invention and is suitable for implementing the helical fiber optic mode scrambler 140 employed by the remote laser delivery system 100 shown in FIG. 1. FIG. 2B shows a cross sectional view of FIG. 2A. FIG. 2C depicts a portion of the scrambler 240 shown in FIG. 2A from the prospective indicated in FIG. 2A. Helical fiber optic mode scrambler 240 is comprised of a portion of fiber optic cable 230 between two spaced locations 235, 237 on the fiber optic cable 230. Helical fiber optic mode scrambler 240 is formed to have a rigid three-dimensional spiral curvature that is predetermined to advantageously influence the intermodal dispersion characteristics of the fiber optic cable 230. Suitable alternate embodiments of a helical fiber optic mode scramblers have a rigid, three-dimensional spiral curvature that are wrapped at least one-half turn (180°) around the longitudinal axis 244. The exemplary embodiment of helical fiber optic mode scrambler 240 shown in FIG. 2 is wrapped 1080° (three turns) about a longitudinal axis 244 with constant radial distance $R_c$ from the longitudinal axis 244 and a pitch P, which is the linear distance between consecutive turns.

One aspect of the present invention provides for efficient use of the fiber optic cable 230 as a result of the full length of the portion of the fiber optic cable 230 comprising the helical fiber optic mode scrambler 240 contributing to influence the intermodal dispersion during operation. Hand held tools, employing remote laser delivery systems, can advantageously obtain further efficiency by implementing the helical fiber optic mode scramblers 240 in-line with the fiber optic cable 230, so that the helical fiber optic mode scrambler 240 contributes to spanning the one to three meter distance commonly spanned by the fiber optic cable 230.

Another aspect of the present invention is that the radius $r_b$ of the bend (bend radius) $r_b$ at any location on the helical fiber optic mode scrambler 240 is substantially larger than the radius $R_c$ of the helical fiber optic mode scrambler 240 allowing helical mode scramblers 240 to be advantageously implemented in a physical space that is substantially small in comparison to the minimal bend radius of the fiber optic cable 230. The bend radius $r_b$ at an example location $n_1$ on helical fiber optic mode scrambler 240 is illustrated by FIG. 2C, which depicts a portion of helical fiber optic mode scrambler 240 from a perspective traverse to the bend plane at point $n_1$.

To accommodate high-energy delivery applications the current trend is toward increased diameter fiber optic cables 230. The number of available higher order modes tends to be increased as the core diameter of the fiber optic cables 230 is increased. A more uniform mode filling during operation tends to allow for further increased energy capacity by providing increased numbers of physical paths in which light energy travel. A more uniform mode filling during operation tends to increase the useful life of the fiber optic cable by providing a more uniform average photon density in the fiber optic cable 230 and less localized heating. The three-dimensional spiral curvature tends to increase the radial symmetry of the average photon density in the planes lying traverse to the direction of travel. In general, when the physical bends in a fiber optic cable lie in a single plane, propagating photons tend to travel co-planar with the plane of the bends. However, less than optimal mode filling results when the internal reflections of propagating photons are more concentrated in the regions near the bend plane in comparison to regions that are more distant from the bend plane. Whereas, when propagating photons encounter a plurality of consecutive physical bends in the fiber optic cable in which the plane of the bend (bend plane) is progressively rotated, the radial symmetry of the average photon density tends to be increased.

The selection of the geometric parameters of embodiments of helical mode scramblers will vary in accordance with the particular application and the characteristics of the fiber optic cable. Preferably the helical fiber optic mode scrambler 240 is formed with pitch P that is at least twenty times the radius $R_c$ to insure skew in the helical fiber optic mode scrambler 230 that is sufficient to advantageously influence on the intermodal dispersion characteristics of the fiber optic cable 230. However, helical mode scramblers 240 formed with P too large in relation to $R_c$ to where the spiral curvature is approximately linear are found in test to be ineffective. In the disclosed embodiment shown in FIG. 2A, pitch P is 3 inches, $R_c$ is 0.125 inches and the linear distance D is 9 inches. Alternate suitable embodiments include pitch P within the range of 3 to 12 inches and $R_c$ within the range of 0.0125 inches to 1.0 inch.

In addition to the selection of geometric parameters pitch P and radius $R_c$, the length L of suitable alternate embodiments is selected to advantageously influence on the intermodal dispersion characteristics of the fiber optic cable 230. One parameter of a helical mode scrambler, that relates the various geometric parameters is the scrambling "effectiveness" of a helical mode scrambler, which can be described mathematically as $$\frac{L}{D},$$

where L is the length of the portion of the fiber optic cable 230 comprising the helical fiber optic mode scrambler 240 and D is the linear distance as illustrated in FIG. 2A. Empirical data has shown that optimal balance of efficiency and effectiveness is obtained when radius $R_c$ is 0.2 to 0.4 inches and effectiveness $$\frac{L}{D}$$

is at least 1.0008.

Suitable embodiments of helical mode scramblers of the present invention include embodiments with spiral curvatures in which magnitude of the radius $R_c$ is varied slightly at different spaced positions on helical fiber optic mode scrambler 240.

FIGS. 3A, 3B, 3C and 3D depict an alternate embodiment of a helical fiber optic mode scrambler 340 of the present invention that is suitable for implementing the helical fiber optic mode scrambler 140 shown in the remote laser delivery system 100 of FIG. 1. FIG. 3A shows a scrambler assembly 300 comprised of helical fiber optic mode scrambler 340 and a cylindrical mandrel 360. Helical fiber optic mode scrambler 340 comprises the portion of fiber optic cable 330 between points 335 and 337 that is wound 180° (one-half turn) around the longitudinal axis 344 of the helical fiber optic mode scrambler 340. FIGS. 3B and 3C show alternate views from the respective perspectives indicated in FIG. 3A of the helical fiber optic mode scrambler 340 with the position of the absent mandrel 360 indicated by broken lines. FIG. 3D shows a cross-sectional view of helical fiber optic mode scrambler 340.

The curvature of the portion of fiber optic cable 330 forming the helical fiber optic mode scrambler 340 is predetermined to provide a desired influence on the intermodal dispersion of the fiber optic cable 330 during operation. The radial symmetry of the average photon density tends to be increased when propagating photons encounter a plurality of consecutive physical bends in the fiber optic cable in which the plane of the bend (bend plane) is sufficiently divergent to significantly influence on the intermodal dispersion. Sufficiently divergence between physical bends is indicated when the angle θ between bend planes of at least two spaced locations on the helical fiber optic mode scrambler 340 is at least 15° and the length L (not shown) of the fiber optic cable 340 comprising the helical mode scrambler 340 contains sufficient physical bending. Empirical data indicates that sufficient amount of length L is included in the helical fiber optic mode scrambler 340 when effectiveness $$\frac{L}{D},$$

is at least 1.0008. L is the length of the portion of the fiber optic cable 330 comprising the helical fiber optic mode scrambler 340 and the full length L is non linear to contribute to the intermodal dispersion characteristics of the fiber optic cable 330, and D is the linear distance, parallel to the longitudinal axis 344, that is spanned by the helical scrambler 340.

FIGS. 3A through 3D are illustrative of the angular relationship between the bends planes of two spaced locations on fiber optic cable 330. The bend plane at any selected locations on the curvature of a helical fiber optic mode scrambler 340 is the plane coincident to a vector and a line, where the vector is traverse to the axis 344 of the helical fiber optic mode scrambler 340 and passes through the selected location (point), and the line is tangent to the selected point. $N_1$ and $N_2$ are a first and a second spaced point on the curvature path of the helical fiber optic mode scrambler 340 that are coincident with the central axis 346 of the fiber optic cable 330. $T_1$ is the line tangent to the first point $N_1$. $V_1$ is a first vector that is traverse to the axis 344 of the helical fiber optic mode scrambler 340 and passes through $N_1$. $T_2$ is the line that is tangent to the second point $N_2$ and $V_2$ is a second vector that is traverse to the axis 344 of the helical fiber optic mode scrambler 340 and passes through $N_2$. The angle θ between bend planes at points $N_1$, $N_2$ is indicated in FIG. 3C, which shows a view from a perspective in-inline with the two vectors $V_1$ and $V_2$.

FIG. 4A depicts a scrambler assembly 400 for implementing a robust helical fiber optic mode scrambler 440 that is suitable for the laser delivery system 100 shown in FIG. 1. Scrambler assembly 400 is comprised of a helical fiber optic mode scrambler 440, which is a portion of a fiber optic cable 430 wound, at constant radial distance $R_c$ (see FIGS. 2B and 3B), around a longitudinal axis. Scrambler assembly 400 is also comprised of an elongated, "Z"-shaped, support structure 460 and a hollow cylindrical sleeve 470, which work in tandem to maintain to the desired spiral curvature of the helical fiber optic mode scrambler 440. The sleeve 470 has first and a second open side 471, 473. The helical fiber optic mode scrambler 440 is wrapped around the support structure 460 one and a half turns (540°). The support structure 460 and helical fiber optic mode scrambler 440 are substantially encircled by the sleeve 470. FIG. 4B depicts the scrambler assembly 400 shown in of FIG. 4A without the sleeve 470 and the position of the absent sleeve 470 shown as broken lines. FIGS. 4C and 4D each show a partial breakaway view of the scrambler assembly 400 from the top and side perspective, respectively, as indicated in FIG. 4A. FIG. 4E shows a side view of the support structure 460 in an uncompressed position and FIG. 4F depicts the support structure 460 from above, as indicated in FIG. 4E.

"Z"-shaped support structure 460 is a ⅛ diameter elongated steel rod, formed with bends in two places that resiliently connect three segments 463, 465, 467 end-to-end forming two obtuse angles that share the center segment 465 and are orientated in generally opposing directions. The center segment 465 is about two and one-half inches long and located approximately in the center of the support structure 460. The shape of the support structure 460 is resilient to deformation in a manner that provides a spring like resistance to lateral compression of the width indicated by dimension $W_1$ (see FIG. 4E). The width $W_1$, in the exemplary embodiment, when in an uncompressed position, is about 5/32 of an inch.

The diameter $D_s$ of the inner cylindrical surface of the sleeve 470 is 1/4 of an inch. To fit within the sleeve 470, the width $W_1$ of the support structure 460 is compressed to equal $D_s$, as shown in FIGS. 4A through 4D. When the support structure 460 is located within the sleeve 470, the vertices 466, 468 of the two obtuse angles contact and exert a radially outwardly directed force on the inner cylindrical surface of the sleeve 470, that tends to create a frictional resistance to longitudinal movement of the support structure 460 relative to the sleeve 470. The sleeve has a first and a second open side 471, 472. A slot 472 is formed in the sleeve near the second open side of the sleeve 473. Slot 472 is adapted to receive a distal end of the support structure 460. The distal end of the support structure 460 is received into slot 472, as shown in FIG. 2A, to resist the rotation of the support structure 460 within the cylindrical sleeve 470. The fixed orientation of the support structure 460 within the sleeve 470 in combination with the contact between the bends 466, 468 of support structure 460 and the inner cylindrical surface of the sleeve 470, cooperate to maintain the desired spiral curvature of the helical fiber optic mode scrambler 440 by countering the inherent tendency of the fiber optic cable 430 to resist bending. In addition, a clear epoxy or glue (not shown) may be applied to further secure the helical fiber optic mode scrambler 440 to the support structure 460 and sleeve 470. The hollow cylindrical sleeve 470, in the disclosed embodiment, is comprised of a translucent nylon material that provides the additional advantage of allowing visual inspection of the shape of the helical fiber optic mode scrambler 440.

Alternate suitable embodiments may include "V"-shaped support structures comprised of two resiliently connected segments that forming one obtuse angle that is suitable to implement a helical scrambler having one turn (360°). Other alternate embodiments may include four-segment support structure (not shown) forming a "W" shaped structure, with three alternately-orientated, obtuse angles, that is suitable to implement a helical scrambler having two turns (720°). Likewise, a five-segment support structure may be used to implement a helical scrambler having two and one-half turns (900°). The width $W_2$ of support structure (see FIG. 4F) is approximately the thickness of the fiber optic cable 430 in the disclosed embodiment. Alternate suitable embodiments include support structures having essentially no width $W_2$, in which is the support structure lies in a plane. Optionally, the radius of the support structure may be greater than the radius $R_c$ of an elongated, cylindrical helical scrambler 440.

A method of constructing the scrambler assembly 400 includes the steps 1 through 5. (Step 1) Position support structure 460 side-by-side a portion of the fiber optic cable 430 near a first end on the fiber optics cable 430, with the support structure 460 orientated with segment 463 about one to two inches from a first end of the fiber optics cable 430. (Step 2) While maintaining the relative position of the support structure 460 and fiber optic cable 430 and with the support structure 460 orientated in relation to the sleeve 370 to where the support structure 460 is rotated 180° from the final position in which the end of the support structure 460 is received into slot 472, insert support structure 460 and the first end of the fiber optic cable 430 into the sleeve 470 through the second open side of sleeve 473, until the first two segments 463, 465 and about one-half of the third segment 467 are within the sleeve and the first end of the fiber optic cable 430 extends out of the first open side the sleeve 473 and a portion of the fiber optic cable 430 extends out of the second open side the sleeve 473. The width $W_1$ compresses as the support structure 460 slides into the sleeve 470. (Step 3) Secure the portion of the fiber optic cable 430 extending out of the first open side of sleeve 471 to the sleeve 470 while rotating 540° the support structure 460 and portion of the fiber optic cable 430 extending from the second open side of the sleeve 473 to form a helical scrambler 440. (Step 4) Slide the support structure 460 and fiber optic cable 430 toward the first open side the sleeve 471 until the distal end of the third segment 467 of support structure 460 is received into the slot 472 as shown in FIGS. 4A through 4D. (Step 5) Inject epoxy into the first and second end of sleeve 470. After the epoxy is cured it further secures the fiber optic cable 430 to the support structure 460 and the sleeve 470.

I claim:

1. A robust helical mode scrambler assembly for improving the light energy transmission characteristic of a fiber optics cable, comprising:
   a fiber optics conductor having first end and a second end and formed with a fixed three-dimensional spiral curvature predetermined to influence the intermodal dispersion during operation; wherein the fiber optics conductor is wound at least 180° around a longitudinal center line,
   a resilient, elongated support structure positioned to have substantial contact with said fiber optics conductor; wherein the elongated support structure has at least one bend resiliently connecting two elongated segment portions end-to-end to form an obtuse angle and wherein the shape of the support structure is resilient to deformation in a manner that provides a spring like resistance to lateral compression; and
   a rigid, hollow, cylindrical sleeve substantially encircling the fiber optics conductor and said elongated support structure; wherein the ends of each of said two elongated segment portions of said elongated support structure exert a radially outwardly directed force on the inner cylindrical surface of the hollow cylindrical sleeve tending to resist movement of said elongated support structure relative to the hollow cylindrical sleeve; and wherein the elongated support structure works in tandem with the rigid, hollow cylindrical sleeve to maintain said desired three-dimensional spiral curvature of said fiber optics conductor.

2. The helical mode scrambler assembly of claim 1, wherein the support structure is comprised of at least three resiliently connected segments connected end-to-end to form two obtuse angles; and wherein the vertices of the two obtuse angles formed by said connected segments contact and exert a radially outwardly directed force on the inner cylindrical surface of the hollow cylindrical sleeve.

3. The helical mode scrambler assembly of claim 1, wherein the sleeve includes a slot that is adapted to engage a portion of the support structure to resist rotation of the support structure about the axis of the cylindrical sleeve.

4. The helical mode scrambler assembly of claim 1, further comprising an epoxy that is in contact with a portion of the fiber optics conductor and a portion of the support structure to resist movement of the fiber optics conductor relative to the sleeve and support structure.

5. The helical mode scrambler assembly of claim 1, wherein the support structure has two spaced bends that resiliently connect three elongated segment portions end-to-end forming two obtuse angles that share a center segment and are orientated essentially in opposite directions; and wherein the fiber optics cable is wound at least one and one-half turns about the longitudinal center line.

6. The helical mode scrambler assembly of claim 1, wherein the sleeve if comprised of a translucent material to allow for visual inspection of a substantial portion of the fiber optics conductor encircled by the sleeve.

7. A remote laser deliver system, comprising:
a light source for selectively generating light energy;
a fiber optics cable with a proximal end and a distal end, wherein the fiber optics cable is coupled to the light source to receive, in the proximal end, light energy generated by the light source and to transmit light energy to the distal end; and wherein the fiber optics cable has a first and a second spaced location defining the boundary of an integral scrambler portion of the fiber optics cable that is located between said first and said second location; wherein the integral scrambler portion has a rigid three-dimensional spiral curvature predetermined to influence the intermodal dispersion characteristics of the fiber optics cable; wherein the integral scrambler portion is wound at least 180° around a central line; a resilient, elongated support structure positioned to have substantial contact with said integral scrambler portion of the fiber optics cable; wherein the elongated support structure has at least one bend resiliently connecting two elongated segment portions end-to-end to form an obtuse angle and wherein the shape of the support structure is resilient to deformation in a manner that provides a spring like resistance to lateral compression; and a rigid, hollow, cylindrical sleeve substantially encircling the integral scrambler portion of the fiber optics cable and said elongated support structure; wherein the ends of each said two elongated segment portions of said elongated support structure exert a radially outwardly directed force on the inner cylindrical surface of the hollow cylindrical sleeve tending to resist movement of said elongated support structure relative to the hollow cylindrical sleeve; and wherein the elongated support structure works in tandem with the rigid, hollow cylindrical sleeve to maintain said desired three-dimensional spiral curvature of said integral scrambler portion of the fiber optics cable;
an output coupling optics coupled to the distal end of the fiber optics, wherein the output coupling optics direct light energy emanating from the distal end of the fiber optics cable to a selectable target surface.

8. The remote laser delivery system of claim 7, further comprising:
input coupling optics coupled to the proximal end of fiber optics cable to receive light energy selectively generated by the light source and then to launch light energy into the fiber optic cable.

9. The remote laser delivery system of claim 7, wherein effectiveness, defined by the ratio of the length of the fiber optics cable between said first and second locations divided by the linear distance that is parallel to said central line and spanned by the integral scrambler portion, is at least 1.0008.

10. The remote laser delivery system of claim 7, wherein the output coupling optics direct light energy to the selectable target surface to provide visual effects, heating, or prolonged light exposure of the selectable target surface.

11. The remote laser delivery system of claim 7, wherein the fiber optics cable and the output coupling optics are positionable, within a limited range, to allow selection of the direction of said light energy emanating from distal end of said fiber optics cable.

12. The remote laser delivery system of claim 7, wherein the fiber optics cable has a core comprised of pure silica.

13. The remote laser delivery system of claim 7, wherein the integral scrambler portion is wound at least 360° around said central line.

14. The remote laser delivery system of claim 7, wherein said linear distance, parallel to the central line, between the first and the second locations on the fiber optics cable is within the range of 1.5 inches to 6 inches, and wherein said constant radial distance from the central line is within the range of 0.0125 inches to 1.0 inch.

15. A light energy conduit adapted to be selectively operated to deliver light energy for producing visual effects, heating, or providing prolonged light exposure of a target surface, said light energy conduit comprising:
an elongated fiber optics cable having a first and second end, wherein, during operation, the said fiber optics cable is adapted to deliver photons launched into the first end to the second end, and to emanate photons from the second end; and
a helical fiber optics mode scrambler formed integral to the fiber optics cable having a fixed curvature predetermined to increase the radial symmetry of the average density of photons propagating through the fiber optics cable during operation;
a resilient, elongated support structure positioned to have substantial contact with said helical fiber optics mode scrambler; wherein the elongated support structure has at least one bend resiliently connecting two elongated segment portions end-to-end to form an obtuse angle and wherein the shape of the support structure is resilient to deformation in a manner that provides a spring like resistance to lateral compression; and
a rigid, hollow, cylindrical sleeve substantially encircling the said helical fiber optics mode scrambler and said elongated support structure wherein the ends of each said two elongated segment portions of said elongated support structure and exert a radially outwardly directed force on the inner cylindrical surface of the hollow cylindrical sleeve tending to resist movement of said elongated support structure relative to the hollow cylindrical sleeve; and wherein the elongated support structure works in tandem with the rigid, hollow cylindrical sleeve to maintain said desired fixed curvature of said helical fiber optics mode scrambler.

16. The light energy conduit of claim 15, wherein effectiveness, defined by the length of the fiber optics cable included in the helical fiber optics mode scrambler divided by the linear distance, parallel to said central line, that is spanned by the helical fiber optics mode scrambler, is at least 1.0008.

17. A method of manufacturing a helical mode scrambler assembly, comprising the steps of:
a. providing a elongated support structure with a first end portion and second end portion, and a width that is resiliently compressible;
b. providing a hollow cylindrical sleeve with a longitudinal axis and with a first open side and a second open side;
c. providing a fiber optics cable; wherein a first location on the fiber optics cable is spaced apart from a second location on the fiber optics cable;
d. sliding, while the support structure and the fiber optics cable are positioned side-by-side, the first end portion of the support structure and a portion of the fiber optics cable into the sleeve through the second open side of sleeve and towards the first open side of sleeve until the first location of the fiber optics cable extends out the first open side of the sleeve and the second portion of the support structure and the second location on the fiber optics cable extends out the second open side of the sleeve, and wherein the resiliently compressible width of the support structure is compressed as the support structure is slid into the sleeve; and e. rotating, relative to the sleeve and first location of the fiber optic cable, the support structure and the second location on the fiber optics cable at least 360° about the longitudinal axis of the sleeve to transform the fiber optic cable to have a rigid three-dimensional spiral curvature predetermined to influence intermodal dispersion characteristics of the fiber optics cable.

18. The method of constructing a helical mode scrambler assembly of claim 17, wherein the sleeve is further formed with a slot located near the second open side of the sleeve; and further comprising the steps of:

f. sliding the support structure and fiber optics cable toward the first open side of the sleeve until the second end portion of the support structure is received into the slot on the sleeve.

19. The method of constructing a helical mode scrambler assembly of claim 17, wherein the elongated support structure is comprised of a first and second segments that are resiliently connected end-to-end to form an obtuse angle.

* * * * *